(12) United States Patent  
Gritzner et al.

(10) Patent No.: US 12,358,201 B2  
(45) Date of Patent: Jul. 15, 2025

(54) METHOD AND APPARATUS FOR HANDLING A DIE UNIT FOR A SHEET EXTRUSION SYSTEM

(71) Applicant: Processing Technologies International, LLC, Aurora, IL (US)

(72) Inventors: Mitchell L. Gritzner, Montgomery, IL (US); Ryan E. Leopold, Aurora, IL (US); Donovan Petry, Plano, IL (US); Dana R. Hanson, St. Charles, IL (US)

(73) Assignee: Processing Technologies International, LLC, Aurora, IL (US)

( * ) Notice: Subject to any disclaimer, the term of this patent is extended or adjusted under 35 U.S.C. 154(b) by 96 days.

(21) Appl. No.: 18/136,627

(22) Filed: Apr. 19, 2023

(65) Prior Publication Data

US 2024/0351264 A1    Oct. 24, 2024

(51) Int. Cl.
| | |
|---|---|
| *B62B 5/00* | (2006.01) |
| *B29C 48/07* | (2019.01) |
| *B29C 48/25* | (2019.01) |
| *B62B 3/10* | (2006.01) |
| *B29L 7/00* | (2006.01) |

(52) U.S. Cl.
CPC .......... *B29C 48/2562* (2019.02); *B29C 48/07* (2019.02); *B62B 3/10* (2013.01); *B62B 5/00* (2013.01); *B29L 2007/002* (2013.01); *B62B 2202/10* (2013.01)

(58) Field of Classification Search
CPC ......... Y10T 29/49718; Y10T 29/49721; Y10T 29/49723; Y10T 29/4973; Y10T 29/49732; B21C 33/00; B21C 23/06; B23P 6/00; B29C 48/265; B29C 48/92; B29C 48/08; B29C 48/2562; B29C 48/266; B29C 48/355
USPC ... 29/281.1, 402.01, 402.03, 402.04, 402.08, 29/402.09; 269/17, 57
See application file for complete search history.

(56) References Cited

U.S. PATENT DOCUMENTS

| | | | | |
|---|---|---|---|---|
| 2,654,147 | A * | 10/1953 | Wilson | ................. B25H 1/0007 269/68 |
| 4,530,492 | A * | 7/1985 | Bork | ....................... B25B 5/142 269/296 |
| 5,051,056 | A * | 9/1991 | Gibbons | ................... B63C 5/00 269/68 |
| 5,127,359 | A * | 7/1992 | Kannari | .................. B05C 11/08 74/89.21 |
| 7,448,606 | B1 * | 11/2008 | Johnson | .............. B05B 13/0285 269/16 |

(Continued)

*Primary Examiner* — Sarang Afzali
*Assistant Examiner* — Darrell C Ford
(74) *Attorney, Agent, or Firm* — Wood, Phillips, Katz, Clark & Mortimer

(57) ABSTRACT

A method of, and apparatus for, handling a first die unit usable on a sheet extrusion system. The method includes the steps of: obtaining a carriage; placing the first die unit in a supported staging position on the carriage, the carriage configured so that with the first die unit in the supported staging position the first die unit can be moved guidingly around an axis; with the first die unit in the supported staging position, moving the first die unit guidingly around the axis to a desired angular orientation to thereby facilitate access to one or more identified regions of the first die unit; and performing an operation at the one or more identified regions of the first die unit.

20 Claims, 18 Drawing Sheets

(56) References Cited

U.S. PATENT DOCUMENTS

| | | | | |
|---|---|---|---|---|
| 8,245,856 | B1* | 8/2012 | Pappin | A63H 17/00 |
| | | | | 211/13.1 |
| 9,016,664 | B1* | 4/2015 | Powers | B05B 13/0285 |
| | | | | 254/8 R |
| 9,527,709 | B2* | 12/2016 | Zamorano Jones | B66F 9/02 |
| 2003/0062663 | A1* | 4/2003 | Fox | B25H 1/0007 |
| | | | | 269/17 |
| 2008/0018037 | A1* | 1/2008 | Genta | B65H 75/246 |
| | | | | 269/57 |
| 2011/0101586 | A1* | 5/2011 | Lands | B25H 1/0007 |
| | | | | 269/57 |
| 2014/0331473 | A1* | 11/2014 | Smith | B64F 5/10 |
| | | | | 29/281.1 |
| 2024/0066577 | A1 | 2/2024 | Hanson et al. | |

* cited by examiner

METHOD AND APPARATUS FOR HANDLING A DIE UNIT FOR A SHEET EXTRUSION SYSTEM

BACKGROUND OF THE INVENTION

Field of the Invention

This invention relates to sheet extrusion systems and, more particularly, to a method and apparatus for handling a die unit used in these systems.

Background Art

One method of forming sheet products involves heating a starting material to a flowable form, controllably discharging the material across a surface of a roll, and thereafter causing cooperating rolls to produce a sheet form that may be further processed downstream.

In high capacity systems, components thereof are generally large and sufficiently heavy that lifting mechanisms, such as cranes, must be utilized to install the components and effect separation thereof, as when maintenance, repair, and/or replacement thereof is required.

A die unit, that is responsible for controlled discharge of the flowable material to against one or more rolls, is one of the components referenced above that is large and commonly weighs several thousand pounds.

The die unit is also a relatively complex structure commonly made up of joined halves that are movable together guidingly around a widthwise axis to allow angular adjustments of the die unit to be made relative to other system components. Maintenance and repair activities may require access to peripheral surface regions on the die unit through potentially 360° around the widthwise axis.

To facilitate handling of die units in facilities in which they are set up and operated, it is common to utilize fork lifts or overhead cranes with cables connected to lifting loops. The lifting loops will generally have a fixed connection to the die unit so that upon being lifted, as by one or more cables, the weight distribution for the die unit will cause the die unit to assume a single orientation. This single orientation is normally arrived at to facilitate assembly and disassembly of the die unit.

The assignee herein offers mounting stands for the die units on its extrusion systems with different configurations—horizontal, vertical, and J-stack (angled). Thus, the orientation that the suspended die unit assumes may be different with each system.

When it becomes necessary to maintain or repair a die unit that is in an operating relationship with the rest of the system components, the die unit will generally be separated by being elevated utilizing the lifting loops and thereafter repositioned and lowered in the maintained orientation. One known technique involves using some sort of a cushioning material, such as plywood, cardboard, or a pallet, over a floor to protect both the die unit and the floor as the die unit is lowered.

Unless the critical area on the die unit to be accessed is positioned to be conveniently accessed upon the die unit's being lowered in the maintained orientation, further repositioning of the die unit is generally required. This repositioning may involve sliding movement, rolling movement, tipping movement, etc., relative to the support surface to orient the die unit so that the desired region thereof can be readily accessed.

Given the weight of the die unit, there is a risk of damaging both the die unit itself and the underlying support surface as this maneuvering takes place. Further, there is inherently a risk of personal injury if persons attempt to directly apply maneuvering forces to the die unit. The use of wedging equipment further raises the risk of damage to the die unit and surrounding environment.

In addition to these problems, the substantial weight and volume of the die unit may make it necessary that there be several individuals available to maneuver the die unit. These individuals might have to stay on hand throughout the procedure performed on the die unit, to be available if needed. Generally, this is an inefficient use of manpower.

Another problem with conventional practices, as described above, is that the staged die unit may monopolize a substantial space within a facility in which maintenance and/or repair are carried out. In the event that there are complications that extend the length of the procedure, it may be necessary to move the die unit to a staging location so as not to interfere with other facility operations. This may involve manual repositioning, machine-assisted lifting, etc. The above inconveniences and risks thus compound.

The assignee herein has developed a method and apparatus for handling large components of extrusion sheet forming systems. This development is the subject of U.S. patent application Ser. No. 17/899,906.

That method and apparatus disclosed in U.S. patent application Ser. No. 17/899,906 were developed for universal handling of many of the large and heavy components making up a sheet extrusion system. The method and apparatus disclosed therein are usable to handle die units, with joinable halves thereof either connected or disassembled. However, the apparatus maintains the die unit/die unit parts in a single orientation while allowing movement, and relative movement, thereof in a translational path. The apparatus in U.S. patent application Ser. No. 17/899,906 addresses a number of the handling problems associated with die units, including staging and repositioning thereof in a facility, but does not facilitate access to a full perimeter area of the die unit as is optimal for convenience, efficiency, and safety.

The industry continues to seek methods and apparatus for safely and conveniently handling the large components typically associated with high-capacity sheet extrusion systems, including facilitating installation, disassembly, repositioning, and reorientation thereof.

SUMMARY OF THE INVENTION

In one form, the invention is directed to a method of handling a first die unit usable on a sheet extrusion system. The method includes the steps of: obtaining a carriage; placing the first die unit in a supported staging position on the carriage; with the first die unit in the supported staging position, moving the first die unit guidingly around an axis to a desired angular orientation to thereby facilitate access to one or more identified regions of the first die unit; and performing an operation at the one or more identified regions of the first die unit.

In one form, the carriage has a main frame and first and second spaced supports on the main frame. The step of placing the first die unit in a supported staging position involves situating the first die unit so that a weight of the first die unit is supported by the first and second supports. The spaced supports are spaced from each other along the axis.

In one form, the first die unit has a width along the axis between spaced first and second sides. The step of placing the first die unit in the supported staging position involves providing a first adaptor at the first side of the first die unit and a second adaptor at the second side of the first die unit and engaging the first adaptor with the first support and engaging the second adaptor with the second support.

In one form, there are parts on: a) the first adaptor and first support; and b) the second adaptor and second support that cooperate to guide movement of the first die unit around the axis.

In one form, the part on the first adaptor has an annular surface. The part on the first support has a plurality of bearings which engage the annular surface.

In one form, the carriage further includes a drive. The method further includes the step of operating the drive to move the first die unit around the axis.

In one form, the first die unit has a width along the axis between spaced first and second sides. The method further includes the step of providing a first adaptor at the first side of the first die unit. The step of operating the drive involves operating the drive to impart a force to the first adaptor that causes the first die unit to move around the axis.

In one form, the drive has an actuator. The step of operating the drive involves moving the actuator to cause a force to be generated through cooperating gears to the first adaptor.

In one form, the method further includes the step of changing a spacing between the first and second spaced supports to accommodate a dimension of the first die unit.

In one form, the first die unit has first and second joined parts. The step of providing a first adaptor at the first side of the die unit involves connecting the first adaptor to each of the first and second joined parts at the first side of the first die unit.

In one form, there is a first spacing between the first and second spaced supports to accommodate the first die unit. The method further includes the steps of: obtaining a second die unit with a different configuration than the first die unit; changing the spacing between the first and second supports to a second spacing that is different than the first spacing; and with the second spacing between the first and second supports, placing the second die unit in a supported staging position on the carriage in place of the first die unit.

In one form, the carriage has indicia associated with at least one of the first and second supports to identify a spacing between the first and second. The method further includes the step of using the indicia to pre-select a desired spacing between the first and second spaced supports that will accommodate the first die unit before the first die unit is placed in the supported staging position.

In one form, the method further includes the step of locking a position of at least one of the first and second spaced supports relative to the main frame to releasably maintain the pre-selected desired spacing between the first and second spaced supports.

In one form, the carriage has a plurality of wheels on the main frame. The method further includes the step of rolling the wheels against a subjacent surface to reposition the carriage.

In one form, the carriage has first and second graspable handles spaced from each other along the axis. The method further includes the step of grasping at least one of the graspable handles and exerting a force on the at least one of the graspable handles to reposition the carriage.

In one form, the carriage has at least one receptacle. The method further includes the step of staging at least one of the first and second adaptors by placing the at least one of the first and second adaptors in the at least one receptacle.

In one form, the first adaptor has an annular surface and a gear element. The step of moving the actuator causes the gear element on the first adaptor to be driven so that the annular surface on the first adaptor turns around the axis and acts against one or more components on the first support to guide turning of the first guide unit around the axis.

In one form, the step of moving the actuator involves manually moving the actuator.

In one form, the first support defines a receptacle for a part of the first adaptor bounded by facing surfaces. With the first die unit in the supported staging position, the part of the first adaptor is confined in axial movement between the facing surfaces.

In one form, the invention is directed to a combination of the first die unit and carriage described above.

DETAILED DESCRIPTION OF THE PREFERRED EMBODIMENT

Figure 1:
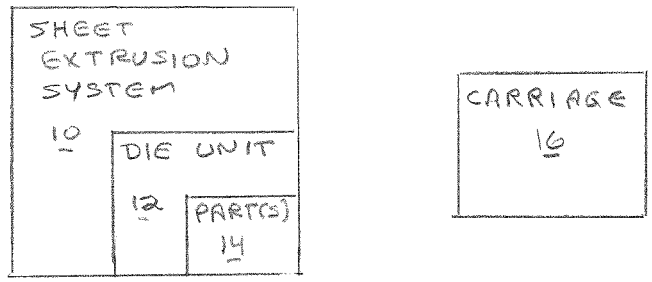
FIG. 1 is a schematic representation of a conventional sheet extrusion system including a die unit and showing a carriage, according to the present invention, usable to maintain the die unit in a supported staging position.

The present invention is directed generally to sheet extrusion systems, as shown schematically at 10 in FIG. 1. More particularly, the invention is concerned with handling of one of the components of the sheet extrusion system 10—a die unit 12 which distributes a flowable material used to form sheets. The die unit 12 may be made of one or more parts 14.

The sheet extrusion system 10 and the die unit 12 are shown schematically since the precise form thereof is not critical to the present invention. The schematic representation is intended to encompass virtually an unlimited number of different sheet extrusion system designs and die unit constructions as used in those systems.

Exemplary sheet extrusion systems 10 are shown in assignee's U.S. Pat. Nos. 11,052,592; 10,406,738; 10,350,810; 10,071,517; 9,182,067; 9,139,393; 8,631,925; 8,342,118; 8,240,180; 8,152,509; 8,021,140; and 7,165,962, the collective disclosure of which is incorporated herein by reference. These systems are representative in nature only and should not be viewed in any way as limiting.

According to the invention, a carriage 16 is used in conjunction with the sheet extrusion system 10 and is designed to maintain the die unit 12 in a supported staging position. With the die unit 12 in the supported staging position on the carriage 16, the die unit 12 can be guidingly reoriented to allow different operations to be performed potentially over the full exposed perimeter surface thereof.

The die unit 12 in the staging position on the carriage 16 may be transported from one location to the next by guiding the carriage 16 over a subjacent surface. With the die unit 12 in the supported staging position on the carriage 16, additional operations may be carried out such as, but not limited to, performing maintenance steps on the die unit 12, repairing the die unit 12, setting the die unit up for installation, performing inspections, etc. There is no limitation as to the operations that may be performed on the die unit 12 when in the supported staging position on the carriage 16.

Figure 2:
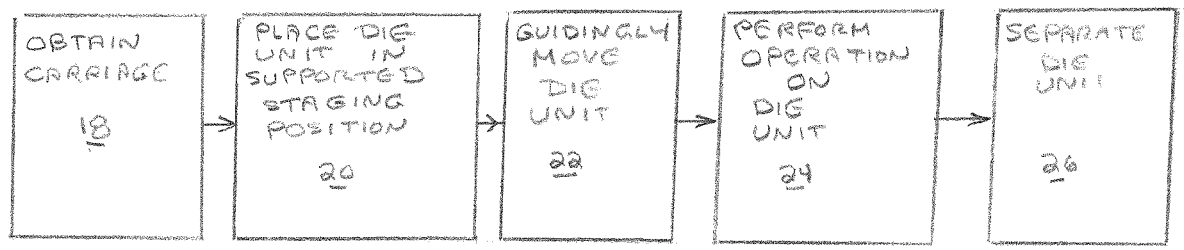
FIG. 2 is a flow diagram representation of a method of handling a die unit, according to the invention.

A method of handling the die unit 12, according to the invention, is shown in flow diagram form in FIG. 2.

As shown at block 18, a carriage 16, configured to support the die unit 12, is obtained.

As shown at block 20, the die unit 12 is placed in a supported staging position on the carriage 16.

As shown at block 22, with the die unit 12 in the supported staging position, the die unit is moved guidingly to facilitate access to one or more identified regions on the die unit.

As shown at block 24, an operation is performed on the die unit 12 at one or more of the identified regions.

As shown at block 26, the die unit 12 is separated from the carriage 16, as to be reinstalled on the sheet extrusion system 10 or for placement elsewhere.

Of course, the carriage 16 might be used anywhere, such as in facilities that operate die units, fabricate die units, repair die units, etc.

Figure 3:
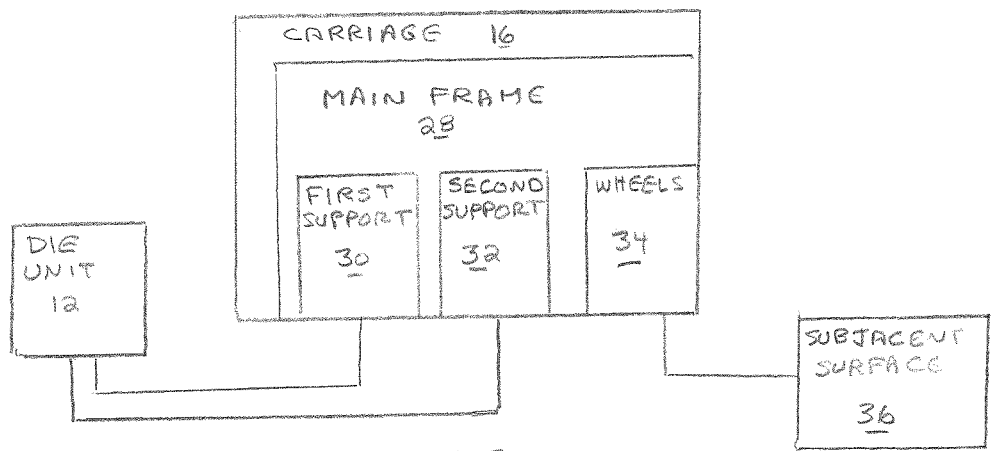
FIG. 3 is a schematic representation showing additional details of the inventive carriage, as depicted schematically in FIG. 1.

Additional details of the carriage 16 are shown schematically in FIG. 3, to include a main frame 28 on which there are first and second supports 30, 32, respectively. The weight of the die unit 12, in the supported staging position therefor, is borne by the first and second supports 30, 32.

Wheels 34 are provided on the main frame 28 to engage and roll against a subjacent surface 36 to allow repositioning of the carriage 16 with the die unit 12 in the supported staging position thereon.

Figure 4:
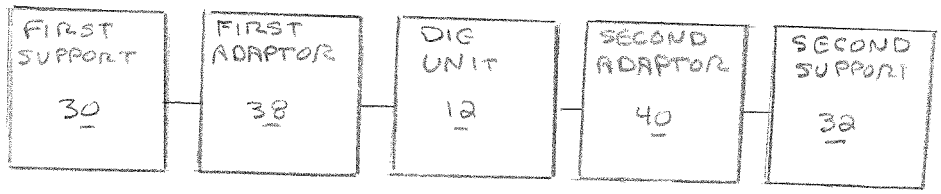
FIG. 4 is a schematic representation showing first and second adaptors on the die unit to cooperate with first and second supports on the inventive carriage.
Figure 6:
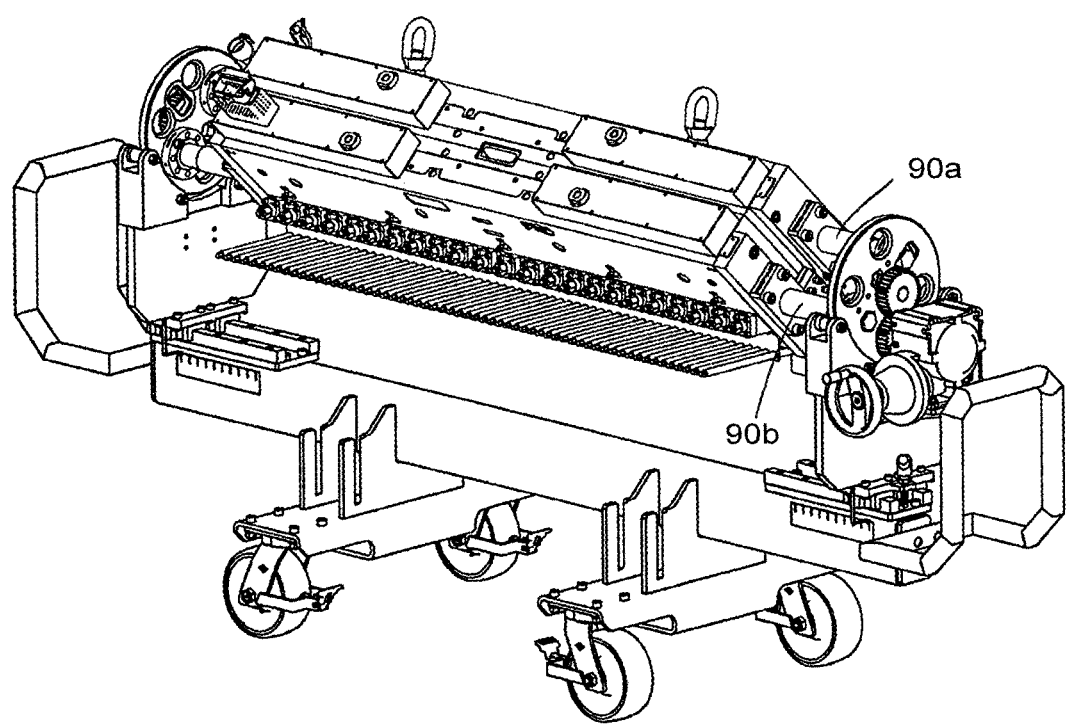
FIG. 6 is a perspective view of the carriage as in FIG. 5 and with the carriage in a different state to accommodate the depicted die unit that has a different/wider configuration and with the die unit in a supported staging position on the carriage.

In one exemplary form, as shown schematically in FIG. 4, a first adaptor 38 cooperates between the die unit 12 and the first support 30, with a second adaptor 40 cooperating between the die unit 12 and the second support 32 to thereby maintain the die unit 12 in the supported staging position on the carriage 16. The first adaptor 38 may be secured to one or both of the die unit 12 and first support 30, with the second adaptor 40 connectable in a like fashion to one or both of the die unit 12 and second support 32.

It should be noted that the reference throughout to the die unit 12 is intended to encompass the die unit 12 made as one part, or multiple joined parts. Further, for simplicity, reference to the die unit 12 is also intended to encompass handling of an individual part 14 thereof as opposed to the entire die unit 12, if made from multiple parts.

An exemplary form of the carriage 16, and its manner of use, are shown in FIGS. 5-22, with it being understood that the schematic depictions of components and processing steps hereinabove are intended to encompass an unlimited number of variations thereof, with the exemplary forms described hereinbelow being only representative in nature.

The main frame 28 on the carriage 16 consists of an elongate beam 42 with spaced cross pieces 44, 46 extending transversely to the length of the beam 42 and each supporting a pair of wheels 34. The wheels 34 are mounted in like fashion, each by a swiveling bracket 48 which incorporates a conventional-type foot operated brake 50. The fixed connection between the beam 42 and cross pieces 44, 46 is maintained by gussets 52, with two gussets 52 acting between each cross piece 44, 46 and the beam 42.

The first support 30 and second support 32 are provided on the main frame 28 at locations spaced from each other along the length of the beam 42.

A spacing between the first and second supports 30, 32 is changeable to accommodate die units 12 with different configurations.

Figure 5:
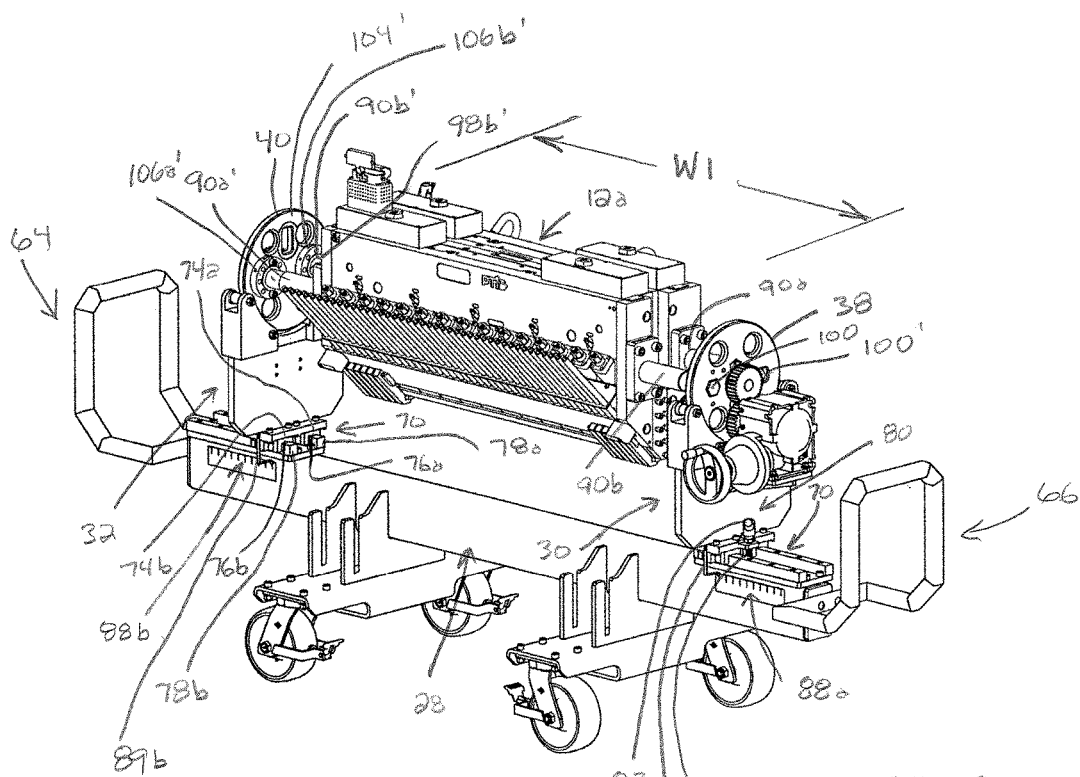
FIG. 5 is a perspective view of an exemplary form of the carriage, as shown schematically in FIGS. 1 and 3, with the carriage in one state to accommodate one configuration of die unit shown in a supported staging position on the carriage.

For example, and without limitation, the carriage 16 is shown to be changeable between a first state, as shown in FIG. 5, and a second state, as shown in FIGS. 6-22. The primary difference between the carriage 16 in the different states is that in the second state, the carriage accommodates a die unit 12 with a width W, whereas in the first state, the carriage 16 accommodates a die unit 12*a* having a width W1 that is less than the width W.

For purposes of understanding the invention, it is not critical to understand details of either die unit 12, 12*a*, such as those incorporated into exemplary systems shown in the assignee's patents, identified above. It suffices to say that the die unit 12 has a main body 54 defined by the combined parts 14(1), 14(2) which produce an overall cuboid shape. Flowable material used to form the sheets is introduced at an inlet location at 56 and ultimately is discharged at an outlet 58 that is elongate in a widthwise direction of the die unit 12.

Figure 8:
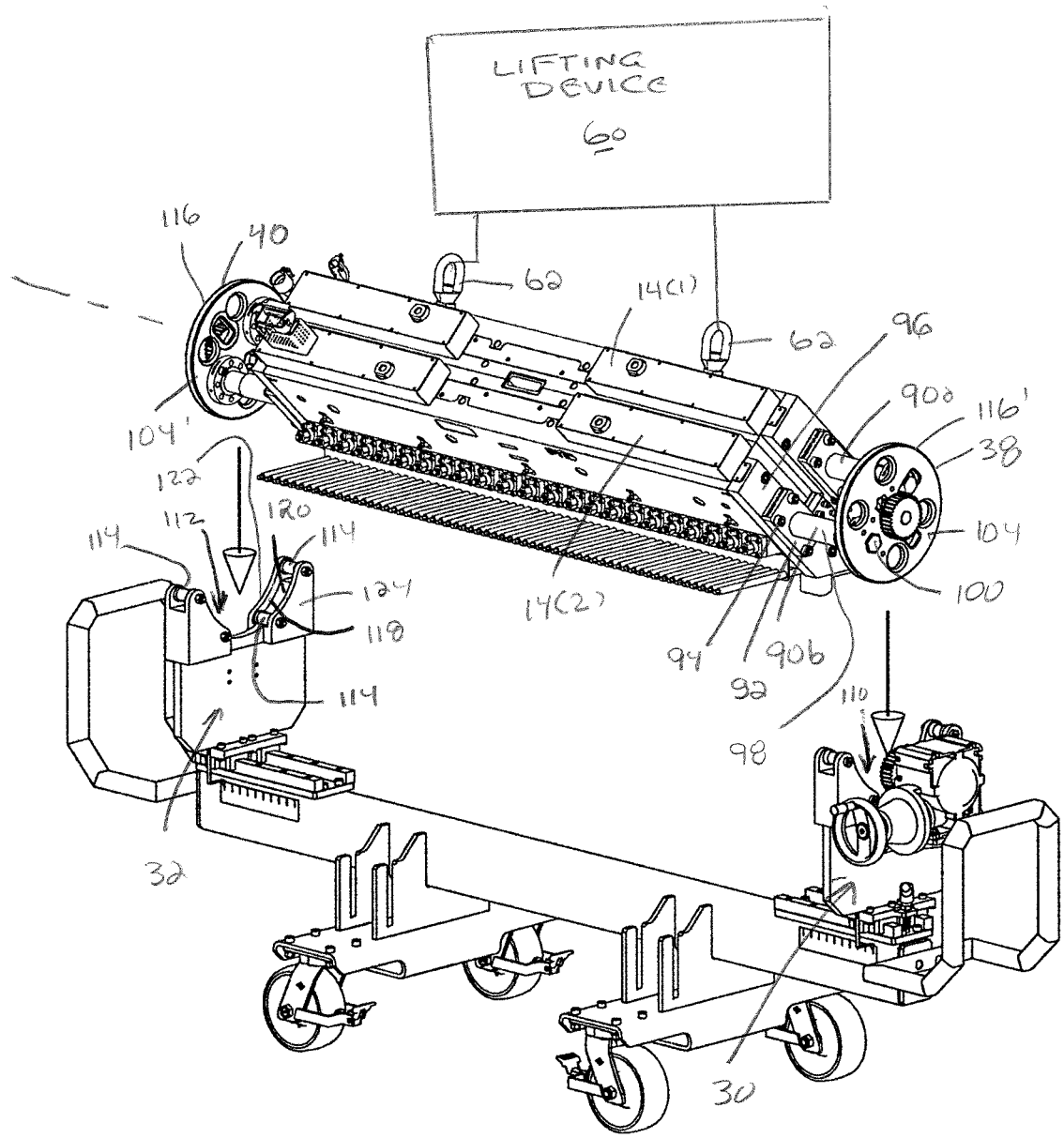
FIG. 8 is an exploded perspective view of the components shown in FIG. 6.

The weight of the die unit 12 is distributed so that a vertical force applied by a lifting device 60 on fixed lifting loops 62 causes the die unit 12 to assume an orientation, as seen for example in FIG. 8, that is approximately that which it will have when in an assembled position on the sheet extrusion system 10.

The carriage 16 is changed between its first and second states by changing a spacing between the first and second supports 30, 32, respectively. While the spacing may be changed by moving only one of the supports 30, 32 relative to the beam 42, preferably both supports 30, 32 are moved so that with the die unit 12 with the associated adaptors 38, 40 bridging the first and second supports 30, 32, the center of mass remains approximately midway between the cross pieces 44, 46, thereby enhancing stability and resisting tipping of either of the lengthwise ends 64, 66 of the carriage 16 to be above or below the other of the ends 64, 66. Thus, preferably, the cross pieces 44, 46 are equidistantly spaced from the center of mass of the die unit 12 in the supported staging position.

To add additional stability, the beam 42 is preferably spaced a distance D (FIG. 14) above the subjacent surface 36 that is relatively short-adequate to permit a clearance volume at 68 beneath the cross pieces 44, 46, whereby the carriage 16 is not prone to hanging up on anticipated objects or contours encountered in a facility within which the die unit 12 is typically being maneuvered.

Each of the first and second supports 30, 32 may be guided in translation along the beam 42 through similar structure. For example, the second support 32 uses a linear bearing arrangement at 70 consisting of two downwardly opening channels 74a, 74b which define slots 76a, 76b, respectively, which are complementary in shape to elongate rails 78a, 78b, respectively.

Figure 7:
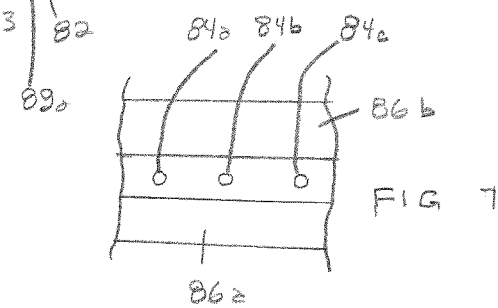
FIG. 7 is a fragmentary, schematic depiction of a locking mechanism to maintain relative positions of supports on the inventive carriage.

Each of the linear bearing arrangements may incorporate a locking mechanism, as shown at 80 for the same linear bearing arrangement 70 associated with the first support 30. As depicted, a vertically translatable locking component 82, through manipulation of an actuator 83, can be selectively advanced into, and withdrawn from, locking openings 84 between rails 78a, 78b. In FIG. 7, three exemplary locking openings 84a, 84b, 84c are depicted, with any number possible and spacing strategically selected to allow desired spacing distances between the supports 30, 32 to be preselected. By raising the locking component 82 out of a locking opening 84, the first support 30 is permitted to be translated back and forth along the length of the beam 42 to allow a desired position to be selected, whereupon the locking component 82 can be lowered into an aligned opening 84 to fix the position of the support 30 along the length of the beam 42.

The second support 32 can be strategically located along the beam length and locked in the same manner.

Separate, alignable indicia 88a, 88b; 89a, 89b are provided on the main frame 28 and supports 30, 32, respectively, to give a visual indication of the lengthwise location of each of the supports 30, 32 and thus the spacing therebetween. Thus, it is possible to use the indicia to preselect a desired spacing between the supports 30, 32 to accommodate a particular die unit configuration, as explained below, and to lock the supports 30, 32 with the preselected desired spacing.

The first adaptor 38 consists of first and second trunnions 90a, 90b with the adaptor 40 having corresponding trunnions 90a', 90b'. Each of the trunnions 90 has substantially the same configuration and each is connected to a side of one of the die unit parts 14(1), 14(2) in the same fashion. Exemplary trunnion 90b has a plate 92 fixed by bolts 94 to a side surface 96 of the die unit part 14(2). The trunnions 90 may be those components used to mount the die unit 12 operatively to the sheet extrusion system 10 or may be substitute components. In the latter case, the trunnions make up part of the respective adaptors 38, 40.

A post 98 projecting from the plate 92 has a polygonally-shaped end 100 that is pressed into keyed relationship within an opening 102 on a disk-shaped component 104 that makes up part of the adaptor 38.

The end of the trunnion 90a cooperates with the disk-shaped component 104 in the same fashion at a diametrically opposite location and an opening 102' threat.

The trunnions 90a', 90b' cooperate with a corresponding disk-shaped component 104', making up the adaptor 40, in substantially the same way the trunnions 90a, 90b cooperate with the component 104 on the adaptor 38. As seen on the adaptor 40, plates 106a', 106b', fixed to the posts 98a', 98b', are connected to the disk-shaped component 104' through threaded fasteners 108.

Figure 9:
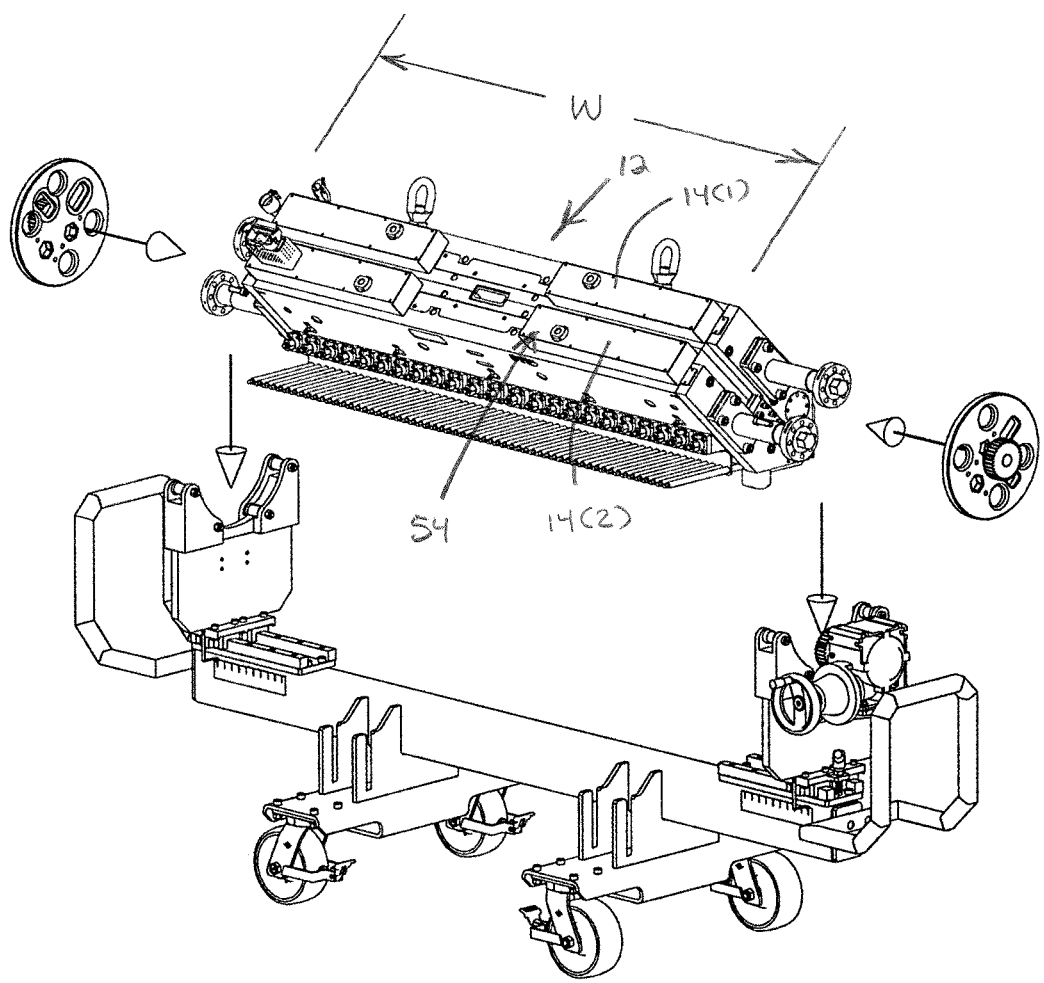
FIG. 9 is a further exploded perspective view of the components as shown in FIG. 8.

The trunnions 90a, 90b are similarly fixed to the disk-shaped component 104, with the plates 106(1)a', 106(1)b' corresponding to the plates 106 shown clearly in FIG. 9.

Figure 10:
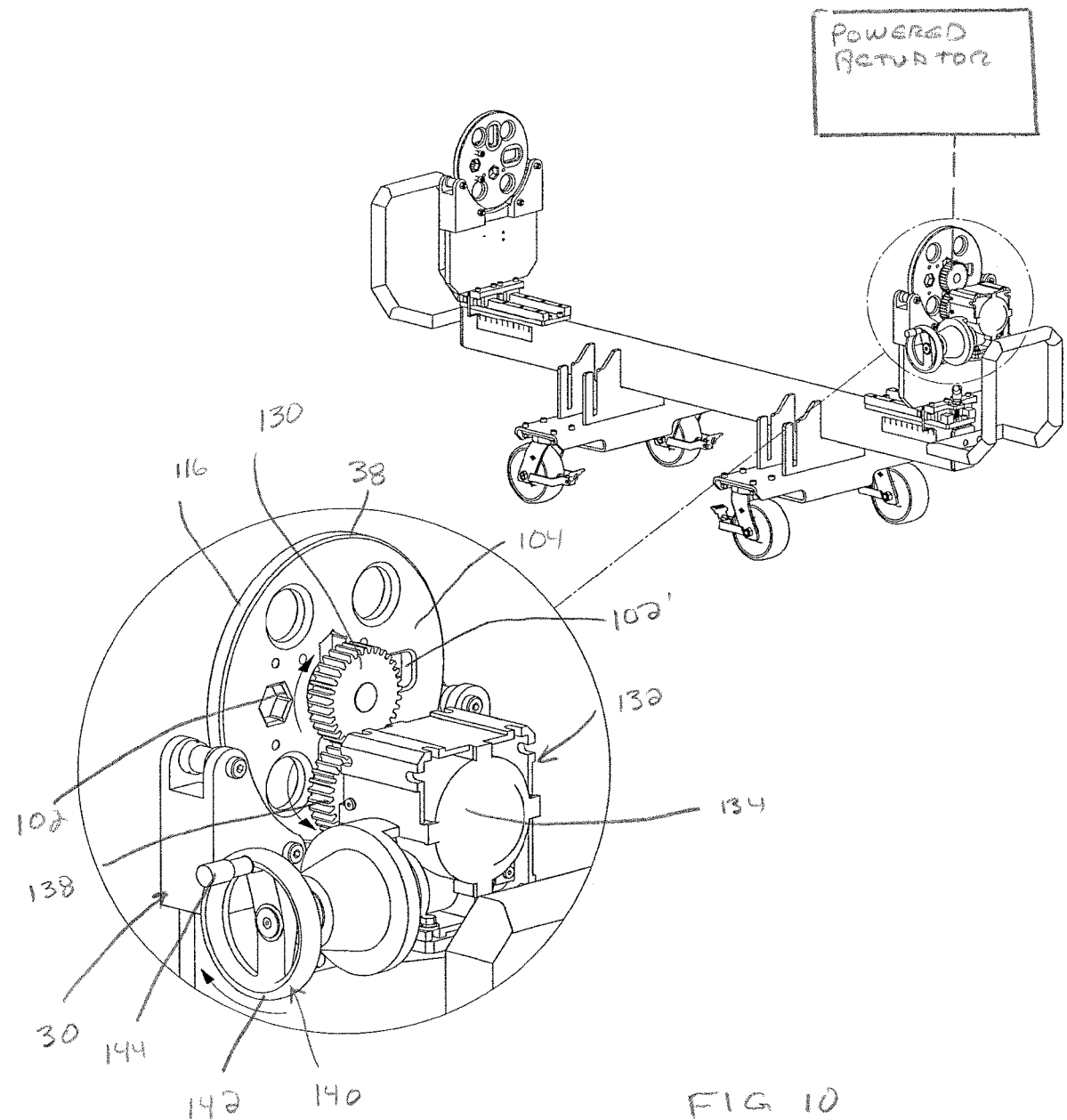
FIG. 10 is a perspective view of the carriage in the state shown in FIGS. 6, 8, and 9 and with adaptors, as shown schematically in FIG. 4, in receptacles on spaced supports on the carriage with a region on one of the supports enlarged to show details thereof.
Figure 11:
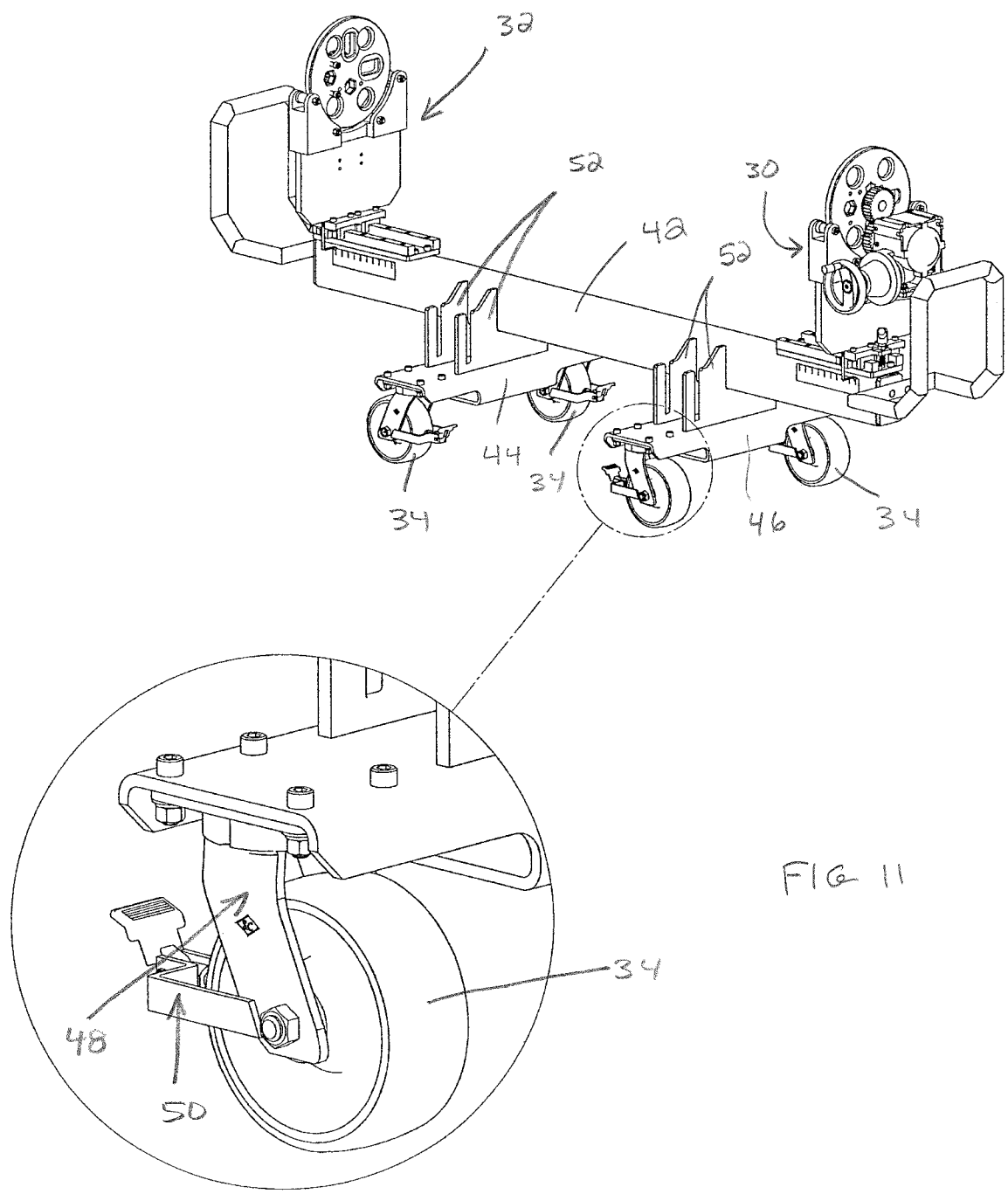
FIG. 11 is a view as in FIG. 10 with a portion of the carriage enlarged to show details of a wheel and braking structure therefor.
Figure 12:
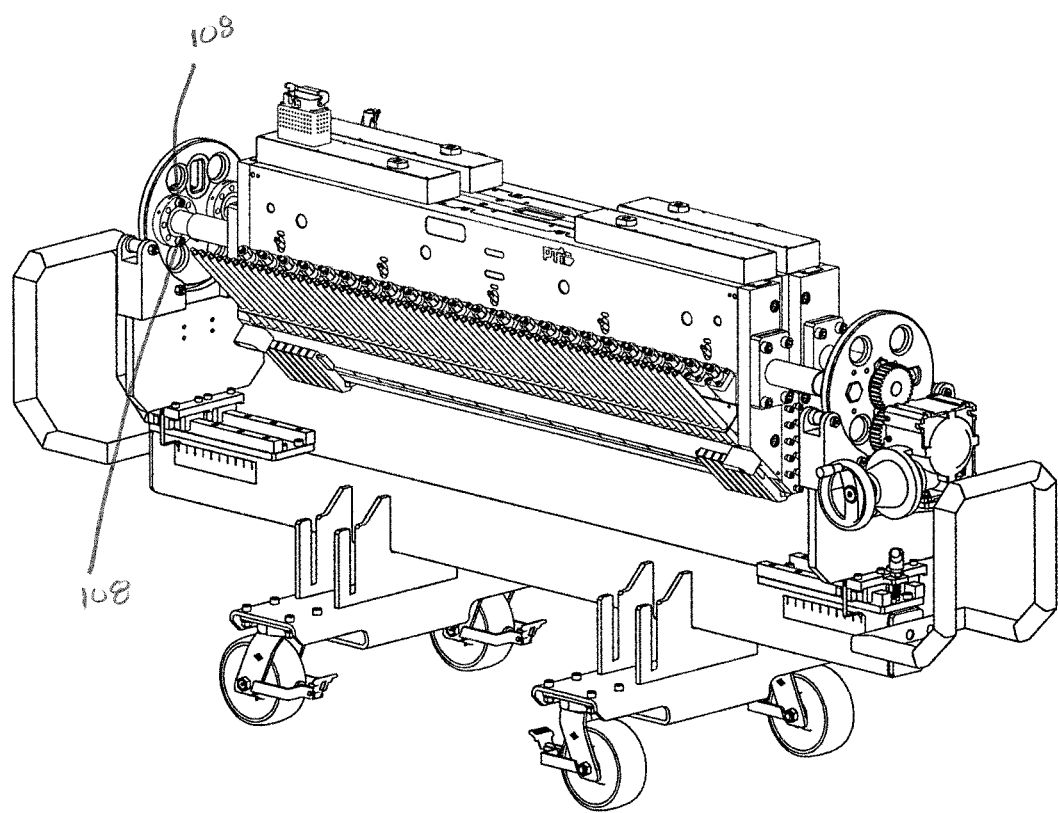
FIG. 12 is a view as in FIG. 6 wherein the die unit has been angularly reoriented.

As seen in FIG. 10, the opening 102' is elongate to allow the polygonally-shaped end 100' on the trunnion 90a to be radially shifted while being keyed against angular movement. This accommodates variations in spacing between the mounted trunnions 90 on the die unit parts 14(1), 14(2).

In the depicted embodiment, the plates 104, 104' have the same configuration so as to be used as part of either of the adaptors 38, 40. While a desired feature, this is not a requirement.

The supports 30, 32 respectively define receptacles 110, 112 for the disk-shaped components 104, 104' on the adaptors 38, 40.

As seen in FIG. 8, the exemplary receptacle 112 has four rolling bearing elements 114 cooperatively defining a conforming seat for an annular outer surface 116 on the disk-shaped component 104'. The receptacle 112 is defined cooperatively by the bearings 114 and facing surfaces 118, 120 on spaced walls 122, 124 on the support 32.

With the disk-shaped component 104' aligned over the receptacle 112, as shown in FIG. 8, lowering of the disk-shaped component 104' causes the peripheral region thereof to move between the wall surfaces 118, 120 downwardly to against the bearings 114. The surfaces 118, 120 confine lengthwise shifting of the disk-shaped component 104' while the bearings 114 cooperatively guide turning of the component 104' around the axis 126 of the disk-shaped component 104'.

The disk-shaped component 104 cooperates with the receptacle 110 on the support 30 that is structurally the same as the receptacle 112 on the support 32. The disk-shaped component 104 is guided in movement around the same axis 126 as the disk-shaped component 104'.

With the adaptors 38, 40 connected to the die unit 12, the disk-shaped components 104, 104' can have a spacing that is determined ahead of time and fixed. Thus, the user can preselect the spacing between the supports 30, 32 to match the spacing between the connected disk-shaped components 104, 104', whereby with the die unit and associated adaptors aligned over the carriage 16 as in FIG. 8, the disk-shaped components 104, 104' can be lowered, one each, into their respective receptacles 110, 112. This represents the supported staging position wherein the circumferential surfaces 116, 116' on the disk-shaped components 104, 104', respectively, are guided by the bearings 114 on the support 32 and like bearings on the support 30 about the axis 126, which is shared by the components 104, 104'.

The disk-shaped component 104 incorporates a gear element 130 that is concentric with the annular surface 116. The gear element 130 becomes a driven component that cooperates with a drive 132 on the support 30. The drive 132 as depicted is a conventional-type gearbox 134 with an output/drive gear 138 in mesh with the driven gear element 130. The gearbox is operated through a manual actuator 140, in this case a hand-operable wheel 142 with a graspable knob 144. Alternatively, the drive may include a powered actuator 145, as seen in dotted lines. By turning the actuator/wheel 142 around the axis 146, the drive gear 138 is caused to drive the driven gear element 130 to cause the disk-shaped component 104 to turn around the axis 126, which thereby turns the die unit 12 and the spaced disk-shaped component 104'. The drive 132 may use a gear reduction design with an oversized actuator/wheel 142 that drives pinion/intermediate meshed spur gears effortlessly to facilitate turning while preventing over/back driving. The gear design is preferably such that the wheel/actuator 142 can be turned with a force that can be comfortably applied by a user.

The wheel/actuator 142 can be selectively moved in opposite directions around the axis 146 to change the direction of turning of the die unit 12 around the axis 126.

Preferably, the system components are dimensioned so that the die unit in the supported staging position can be turned through 360° without interference between the die unit and the carriage 16.

Figure 13:
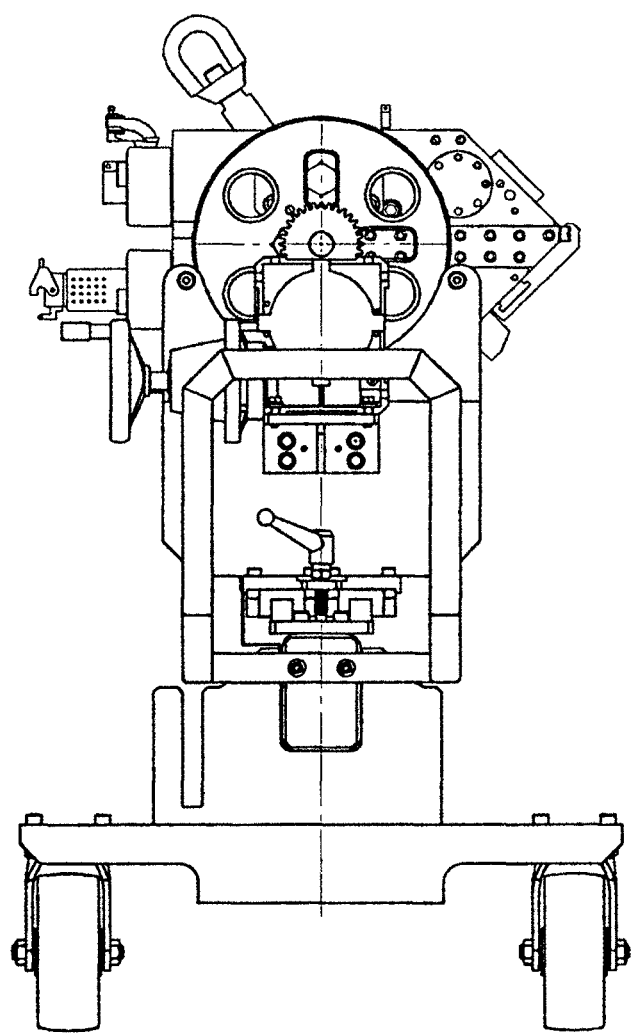
FIG. 13 is an end view of the carriage with a die unit as in FIG. 12 in a supported staging position thereon.
Figure 14:
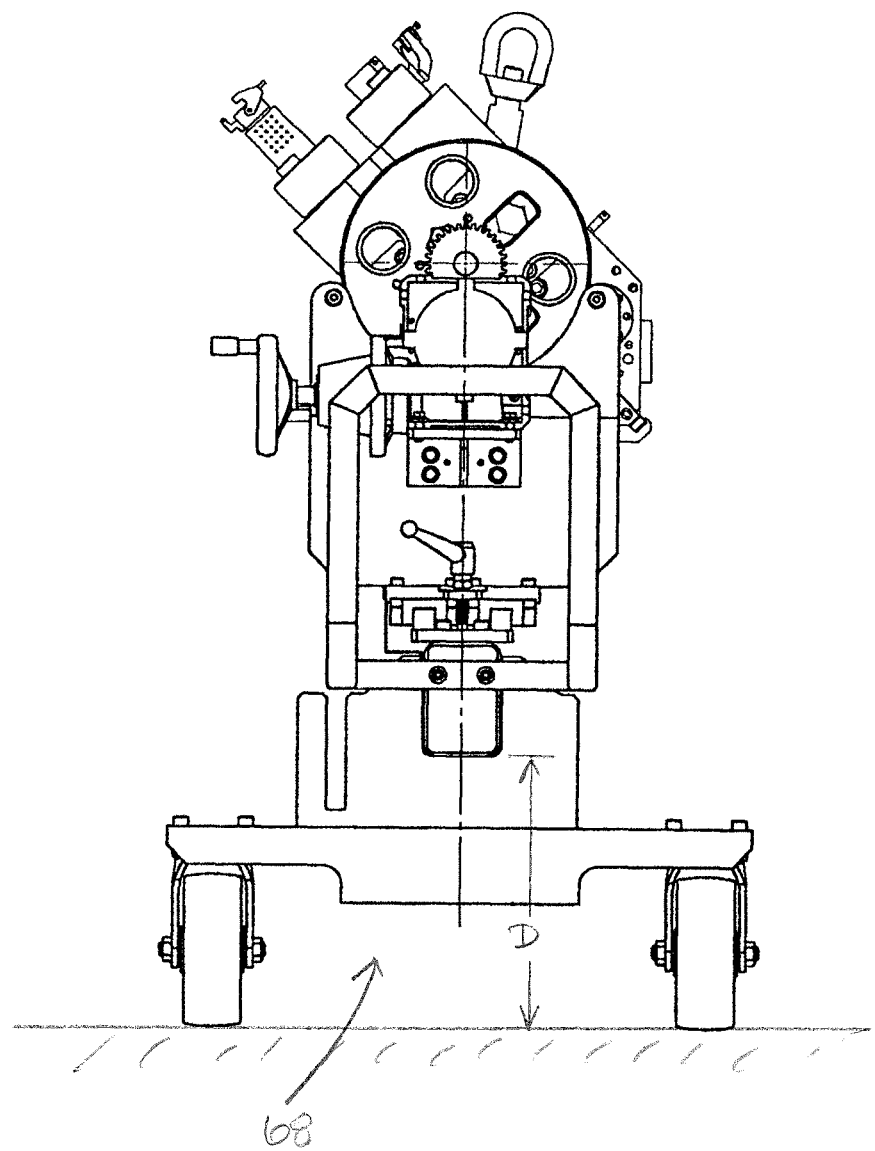
FIG. 14 is a view as in FIG. 13 wherein the die unit has been turned 45° from the FIG. 13 position.
Figure 15:
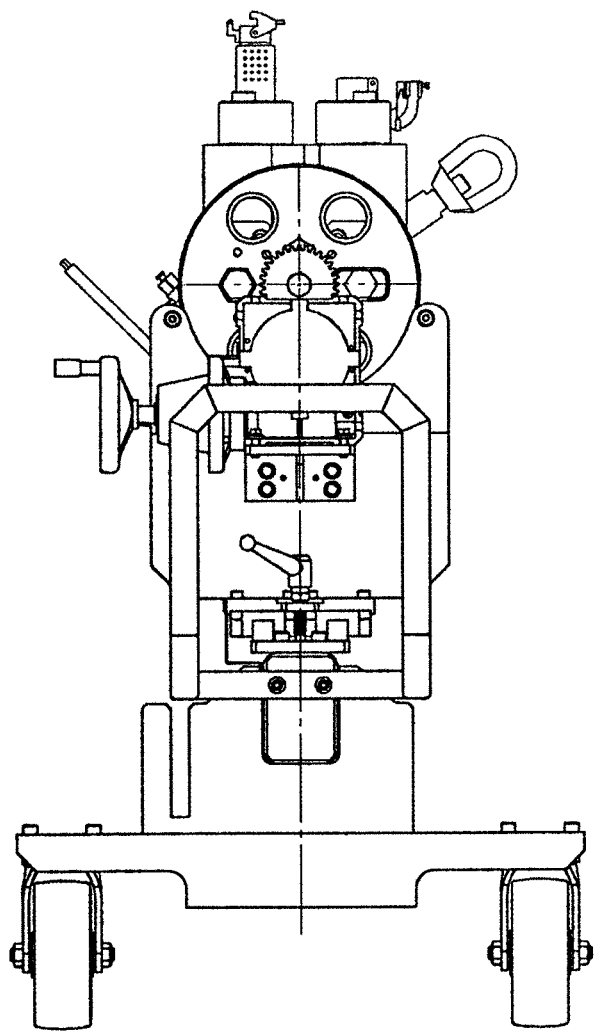
FIG. 15 is a view as in FIG. 14 wherein the die unit has been turned 45° from the FIG. 14 position.
Figure 16:
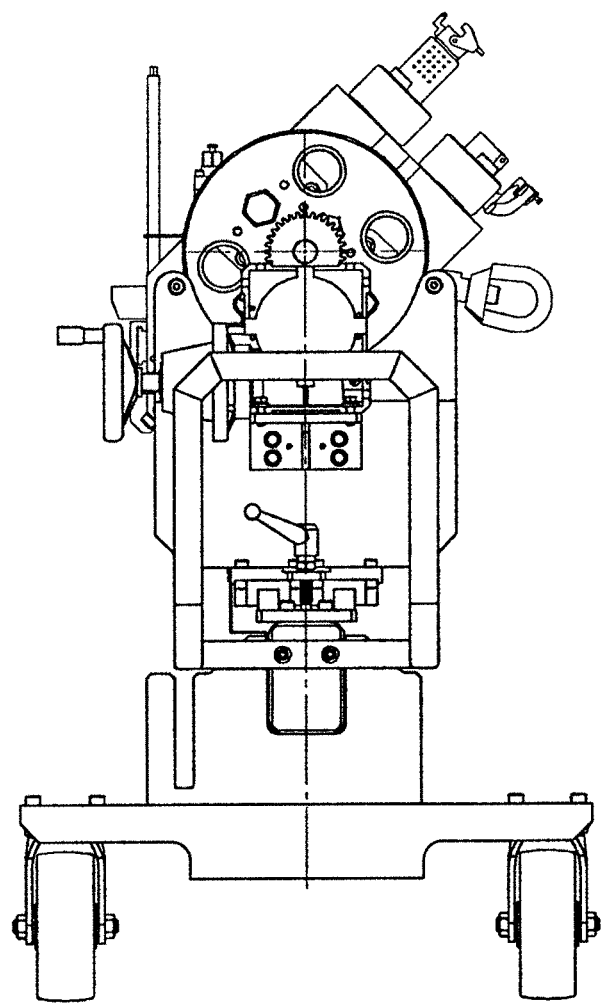
FIG. 16 is a view as in FIG. 15 wherein the die unit has been turned 45° from the FIG. 15 position.
Figure 17:
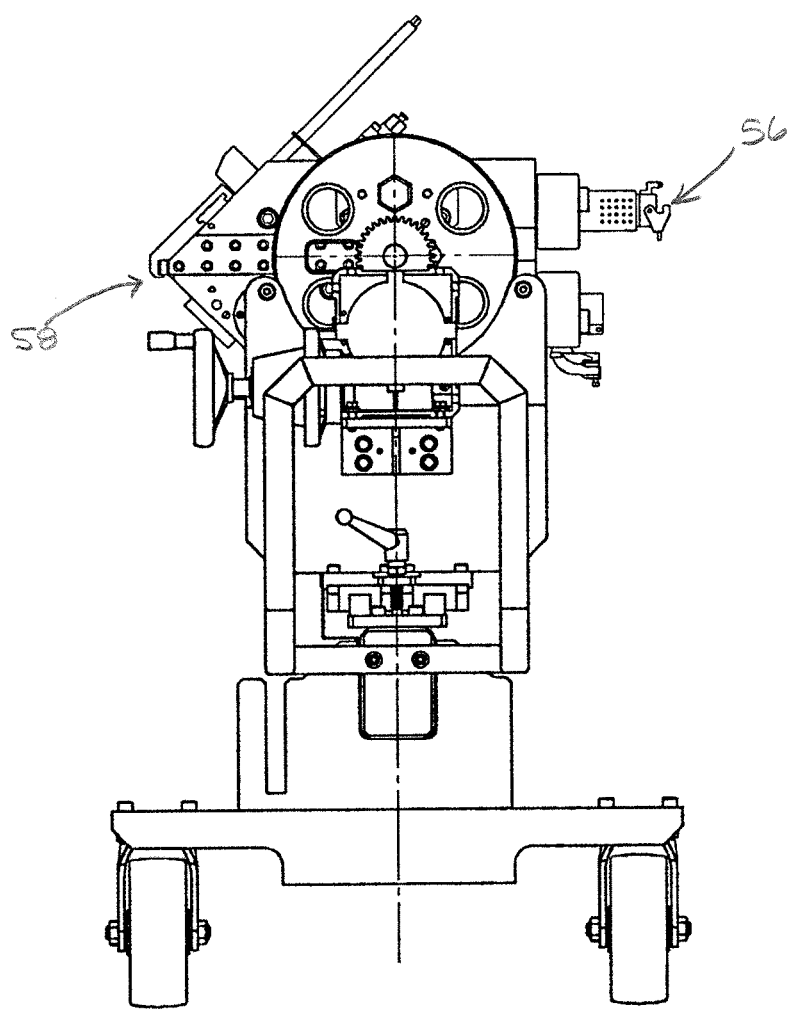
FIG. 17 is a view as in FIG. 16 wherein the die unit has been turned 45° from the FIG. 16 position.
Figure 18:
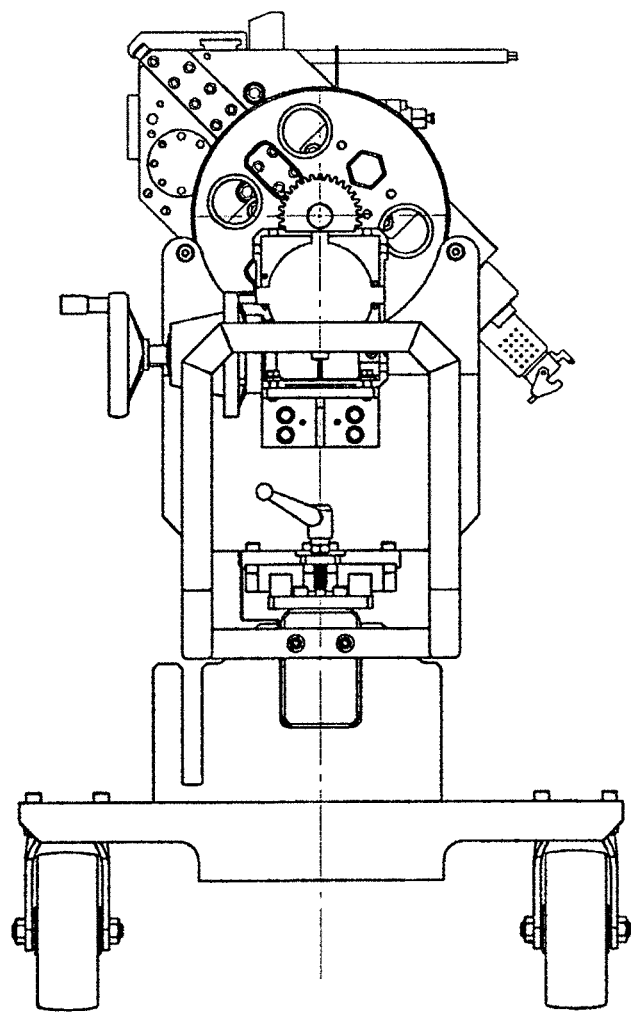
FIG. 18 is a view as in FIG. 17 wherein the die unit has been turned 45° from the FIG. 17 position.
Figure 19:
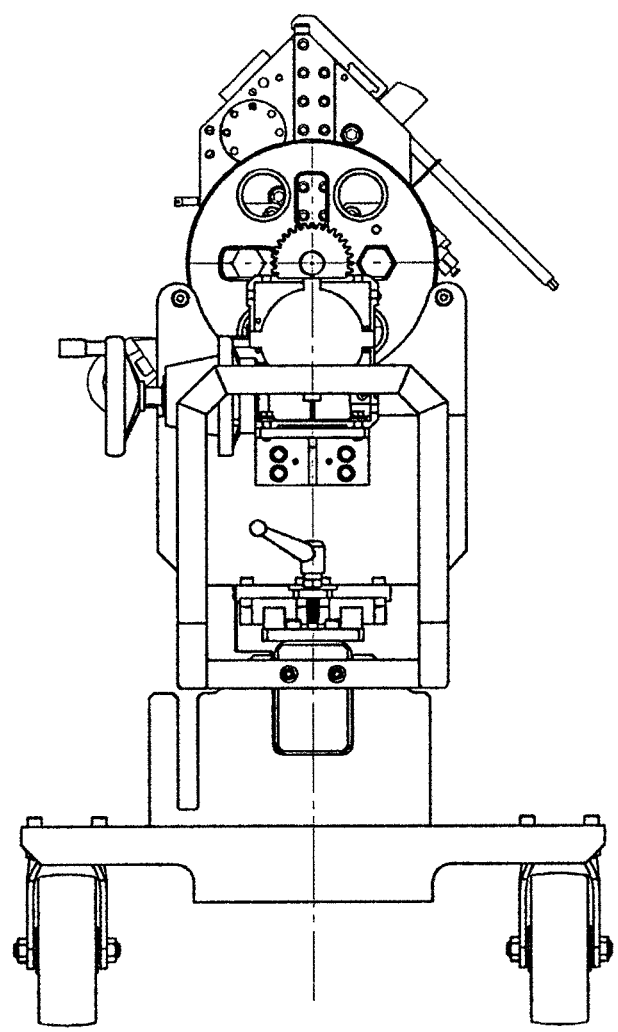
FIG. 19 is a view as in FIG. 18 wherein the die unit has been turned 45° from the FIG. 18 position.
Figure 20:
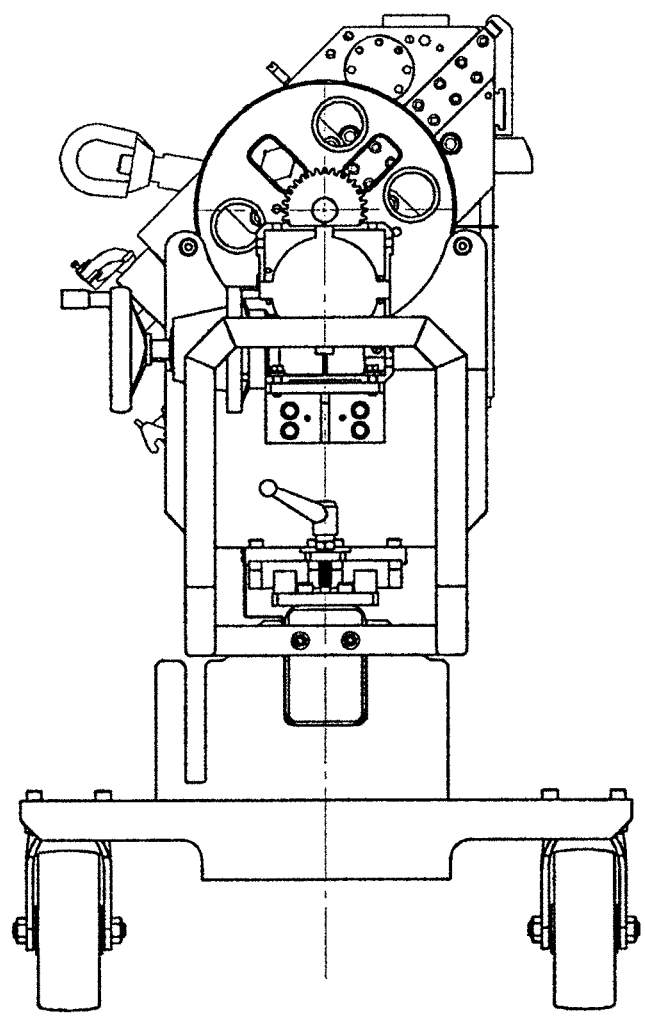
FIG. 20 is a view as in FIG. 19 wherein the die unit has been turned 45° from the FIG. 19 position.

As shown sequentially in FIGS. 13-20, the die unit 12 is turned clockwise in increments of 45° starting with the die unit 12 at "0°" in FIG. 13. The user can maintain a desired angular orientation for the die unit to thereby conveniently access one or more identified regions. While this orientation is maintained, a desired operation can be performed.

While FIGS. 13-20 show sequential turning of the die unit in one direction around the axis 126, as noted above, controlled turning of the die unit 12 in opposite directions around the axis is allowed, with turning direction dictated by the direction of turning of the wheel/actuator 142 about its axis 146.

By having the ability to turn the die unit through 360°, a thorough inspection of the entire die unit can be conveniently carried out.

The axis 126 is preferably located near the center of gravity for the die unit 12, 12a. Thus, through the full turning range for the die unit 12, 12a, a substantial weight imbalance may be avoided tending to urge the die unit 12, 12a towards one or more angular positions through the 360° range. This potentially allows turning of the die unit 12, 12a in the supported staging position by applying a substantially constant turning force on the wheel/actuator 142 through the entire 360° turning range. Further, controlling weight imbalance may reduce stress on parts and contribute to overall stability of the carriage with the die unit 12, 12a in the supported staging position thereon.

The carriage 16 has the versatility to accommodate dies of different configuration—such as significantly different widths. As previously indicated, the carriage 16 can be changed to the first state of FIG. 5 to accommodate a die unit 12a with a width W1 less than the width W of the die unit 12. To effect the change of state, the spacing between the supports 30, 32 can be changed as described above.

The carriage may accommodate the lowering die unit, regardless of its orientation around the axis 126.

The ability to conveniently wheel the carriage 16 over the subjacent surface is desirable to maneuver the carriage 16 into an appropriate relationship with a sheet extrusion system 10 to facilitate transfer of the die unit between the carriage 16 and the sheet extrusion system 10. Further, it is desirable to be able to move the carriage with the die unit in a supported staging position around a facility to manage space and strategically place the die unit for staging, storage, or for working thereon.

To facilitate movement of the carriage, both with and without the die unit thereon, graspable handles 148, 150 are provided at the ends of the carriage 16—spaced along the length of the beam 42 and the axis 126. The handles 148, 150 have elongate grasping lengths 152, 154, respectively, that can be conveniently engaged by potentially multiple persons to facilitate maneuvering of the carriage 16 with a potentially very heavy die unit.

Figure 21:
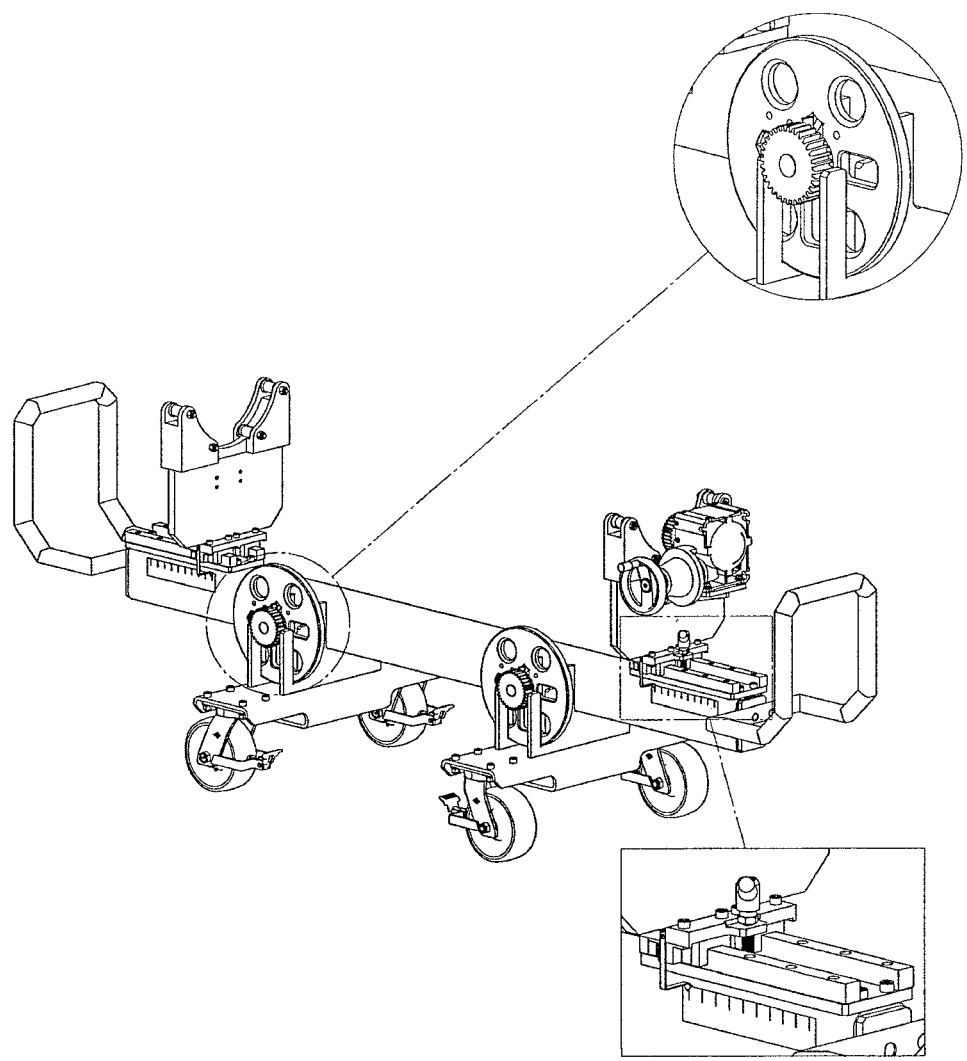
FIG. 21 is a perspective view of a modified form of the inventive carriage including receptacles for storing the adaptors, as shown schematically in FIG. 4, with different portions of the frame enlarged to show details thereof.
Figure 22:
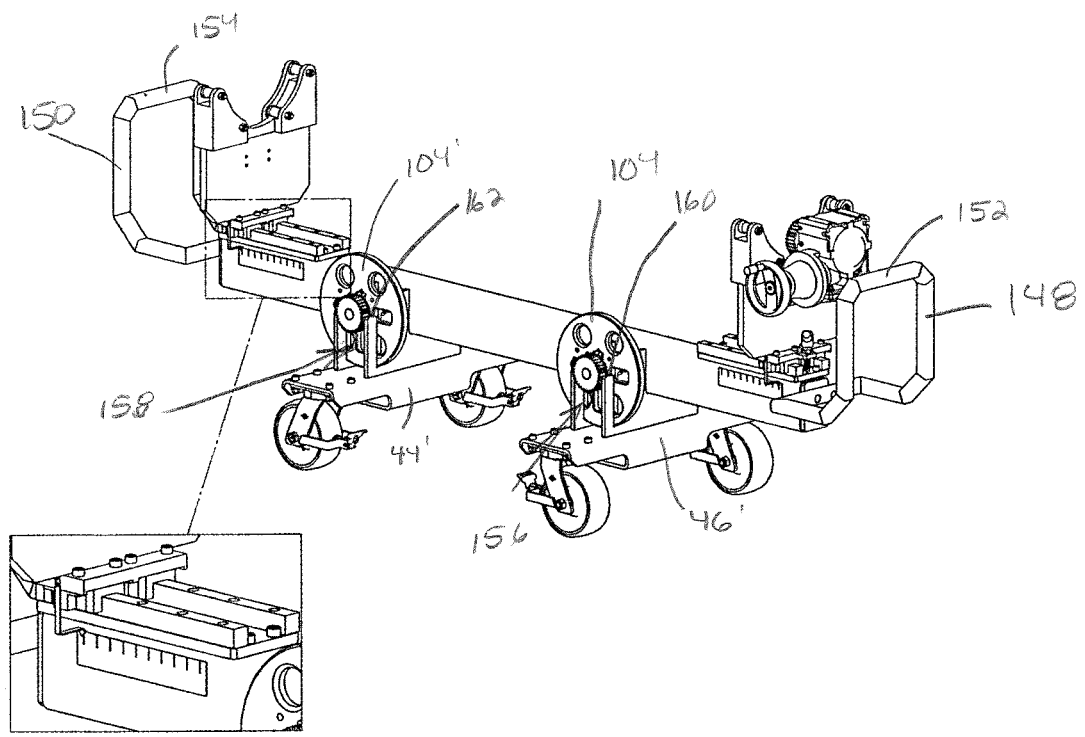
FIG. 22 is a view as in FIG. 21 with a different portion thereof enlarged to show details of translational guiding structure between the supports relative to a main frame on the carriage.

For convenience, as shown in FIGS. 21 and 22, a modified form of the cross pieces 44', 46' may include stands 156, 158, respectively, which define receptacles 160, 162, respectively, into which the disk-shaped components 104, 104' can be lowered to be staged/stored when not in use. As a result, the disk-shaped components 104, 104' remain at all times with the carriage so that they are readily available when they need to be used. Misplacing one or more of the disk-shaped components could otherwise delay operations.

For convenience, the adaptors 38, 40 are shown to be identical since the gear element 13a does not interfere with engagement of the components 104, 104' within their respective receptacle 110, 112. This is not a requirement, however.

The foregoing disclosure of specific embodiments is intended to be illustrative of the broad concepts comprehended by the invention.

The invention claimed is:

1. A method of handling a first die unit usable on a sheet extrusion system, the method comprising the steps of:
   obtaining a carriage having first and second spaced supports;
   placing the first die unit in a supported staging position on the carriage by lowering the first die unit from a position spaced above the first and second supports so that a weight of the first die unit bears against the first and second spaced supports on the carriage with the first die unit in the supported staging position,
   the carriage configured so that with the first die unit in the supported staging position the first die unit can be moved guidingly around an axis;
   with the first die unit in the supported staging position, moving the first die unit guidingly around the axis to a desired angular orientation to thereby facilitate access to one or more identified regions of the first die unit; and
   performing an operation at the one or more identified regions of the first die unit.

2. The method of handling a first die unit according to claim 1 wherein the carriage comprises a main frame, the first and second spaced supports are on the main frame, and the first and second spaced supports are spaced from each other along the axis.

3. The method of handling a first die unit according to claim 2 wherein the first die unit has a width along the axis between spaced first and second sides, and the step of placing the first die unit in the supported staging position comprises providing a first adaptor at the first side of the first die unit and a second adaptor at the second side of the first die unit and engaging the first adaptor with the first support and engaging the second adaptor with the second support, the first and second adaptors connected to, and movable with, the first die unit as the first die unit is placed in the supported staging position.

4. The method of handling a first die unit according to claim 3 wherein there are parts on: a) the first adaptor and first support; and b) the second adaptor and second support that cooperate to guide movement of the first die unit around the axis.

5. The method of handling a first die unit according to claim 4 wherein the part on the first adaptor comprises an annular surface and the part on the first support comprises a plurality of bearings which engage the annular surface with the first die unit in the supported staging position.

6. The method of handling a first die unit according to claim 3 wherein the first die unit comprises first and second joined parts and the step of providing a first adaptor at the first side of the die unit comprises connecting the first adaptor to each of the first and second joined parts at the first side of the first die unit.

7. The method of handling a first die unit according to claim 3 wherein the carriage comprises at least one receptacle and the method further comprises a step of staging at least one of the first and second adaptors by placing the at least one of the first and second adaptors in the at least one receptacle.

8. The method of handling a first die unit according to claim 3 wherein the first support defines a receptacle for a part of the first adaptor bounded by facing surfaces and wherein with the first die unit in the supported staging position, the part of the first adaptor is confined in axial movement between the facing surfaces.

9. The method of handling a first die unit according to claim 2 further comprising a step of changing a spacing between the first and second spaced supports to accommodate a dimension of the first die unit.

10. The method of handling a first die unit according to claim 9 wherein there is a first spacing between the first and second spaced supports to accommodate the first die unit and the method further comprises steps of obtaining a second die unit with a different configuration than the first die unit, changing the spacing between the first and second supports to a second spacing that is different than the first spacing, and with the second spacing between the first and second supports, placing the second die unit in a supported staging position on the carriage in place of the first die unit.

11. The method of handling a first die unit according to claim 9 wherein the carriage comprises indicia associated with at least one of the first and second supports to identify a spacing between the first and second supports, and further comprising a step of using the indicia to pre-select a desired spacing between the first and second spaced supports that will accommodate the first die unit before the first die unit is placed in the supported staging position.

12. The method of handling a first die unit according to claim 11 further comprising a step of locking a position of at least one of the first and second spaced supports relative to the main frame to releasably maintain the pre-selected desired spacing between the first and second spaced supports.

13. The method of handling a first die unit according to claim 1 wherein the carriage further comprises a drive, and the method further comprises a step of operating the drive to move the first die unit around the axis.

14. The method of handling a first die unit according to claim 13 wherein the first die unit has a width along the axis between spaced first and second sides and further comprising a step of providing a first adaptor at the first side of the first die unit, and the step of operating the drive comprises operating the drive to impart a force to the first adaptor that causes the first die unit to move around the axis.

15. The method of handling a first die unit according to claim 14 wherein the drive comprises an actuator and the step of operating the drive comprises moving the actuator to cause a force to be generated through cooperating gears to the first adaptor.

16. The method of handling a first die unit according to claim 15 wherein the first adaptor comprises an annular surface and a gear element and the step of operating the drive causes the gear element on the first adaptor to be driven so that the annular surface on the first adaptor turns around the axis and acts against one or more components on the first support to guide turning of the first guide unit around the axis.

17. The method of handling a first die unit according to claim 15 wherein the step of operating the drive comprises manually moving the actuator.

18. The method of handling a first die unit according to claim 15 wherein the cooperating gears comprise a gear on the first adaptor and a gear on the carriage and the gear on the first adaptor and gear on the carriage are engaged as an incident of the first die unit being lowered into the supported staging position on the carriage.

19. The method of handling a first die unit according to claim 1 wherein the carriage has a plurality of wheels on the main frame and the method further comprises a step of rolling the wheels against a subjacent surface to reposition the carriage.

20. The method of handling a first die unit according to claim 19 wherein the carriage comprises first and second graspable handles spaced from each other along the axis and further comprising steps of grasping at least one of the graspable handles and exerting a force on the at least one of the graspable handles to reposition the carriage.

* * * * *